(12) United States Patent
Bosse et al.

(10) Patent No.: US 11,543,263 B1
(45) Date of Patent: Jan. 3, 2023

(54) MAP DISTORTION DETERMINATION

(71) Applicant: Zoox, Inc., Foster City, CA (US)

(72) Inventors: Michael Carsten Bosse, Cupertino, CA (US); Brice Rebsamen, San Jose, CA (US); Francesco Papi, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 254 days.

(21) Appl. No.: 17/023,288

(22) Filed: Sep. 16, 2020

(51) Int. Cl.
*G01C 21/00* (2006.01)
*G05D 1/02* (2020.01)
*B60W 60/00* (2020.01)
*B60W 50/06* (2006.01)
*G06N 20/00* (2019.01)
*G06N 5/04* (2006.01)

(52) U.S. Cl.
CPC ......... *G01C 21/3859* (2020.08); *B60W 50/06* (2013.01); *B60W 60/001* (2020.02); *G01C 21/3807* (2020.08); *G01C 21/3841* (2020.08); *G05D 1/027* (2013.01); *G05D 1/0257* (2013.01); *G05D 1/0274* (2013.01); *G06N 5/04* (2013.01); *G06N 20/00* (2019.01); *B60W 2420/52* (2013.01); *G05D 2201/0213* (2013.01)

(58) Field of Classification Search
CPC ............ G01C 21/3859; G01C 21/3841; G01C 21/3801; G06N 20/00; G06N 5/04; B60W 60/001; B60W 50/06; B60W 2420/52; G05D 1/0257; G05D 1/0274; G05D 2201/0213
See application file for complete search history.

(56) References Cited

U.S. PATENT DOCUMENTS

| | | | |
|---|---|---|---|
| 10,571,926 B1 * | 2/2020 | Zhang | G05D 1/0274 |
| 2020/0192388 A1 * | 6/2020 | Zhang | G06V 20/10 |
| 2020/0247431 A1 * | 8/2020 | Ferencz | G01C 21/3658 |
| 2020/0257301 A1 * | 8/2020 | Weiser | G06N 3/02 |
| 2020/0377088 A1 * | 12/2020 | Fukushige | B60W 30/18163 |
| 2021/0063162 A1 * | 3/2021 | Moskowitz | G01C 21/28 |
| 2021/0174097 A1 * | 6/2021 | Tsai | G06V 20/10 |
| 2022/0215603 A1 * | 7/2022 | Goldman | G06T 11/203 |

\* cited by examiner

*Primary Examiner* — Peter D Nolan
*Assistant Examiner* — Mikko Okechukwu Obioha
(74) *Attorney, Agent, or Firm* — Lee & Hayes, P.C.

(57) ABSTRACT

Techniques for determining distortion in a map caused by measurement errors are discussed herein. For example, such techniques may include implementing a model to estimate map distortion between the map frame and the inertial frame. Data such as sensor data, map data, and vehicle state data may be input into the model. A map distortion value output from the model may be used to compensate vehicle operations in a local region by approximating the distortion as linearly varying about the region. A vehicle, such as an autonomous vehicle, can be controlled to traverse an environment based on the trajectory.

20 Claims, 4 Drawing Sheets

MAP DISTORTION DETERMINATION

BACKGROUND

Data can be captured in an environment and represented as a map of the environment. Often, such maps can be used by vehicles navigating within the environment, although the maps can be used for a variety of purposes. When using the maps for navigating, however, differences between localization determined using the map and other methods may cause safety critical issues.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
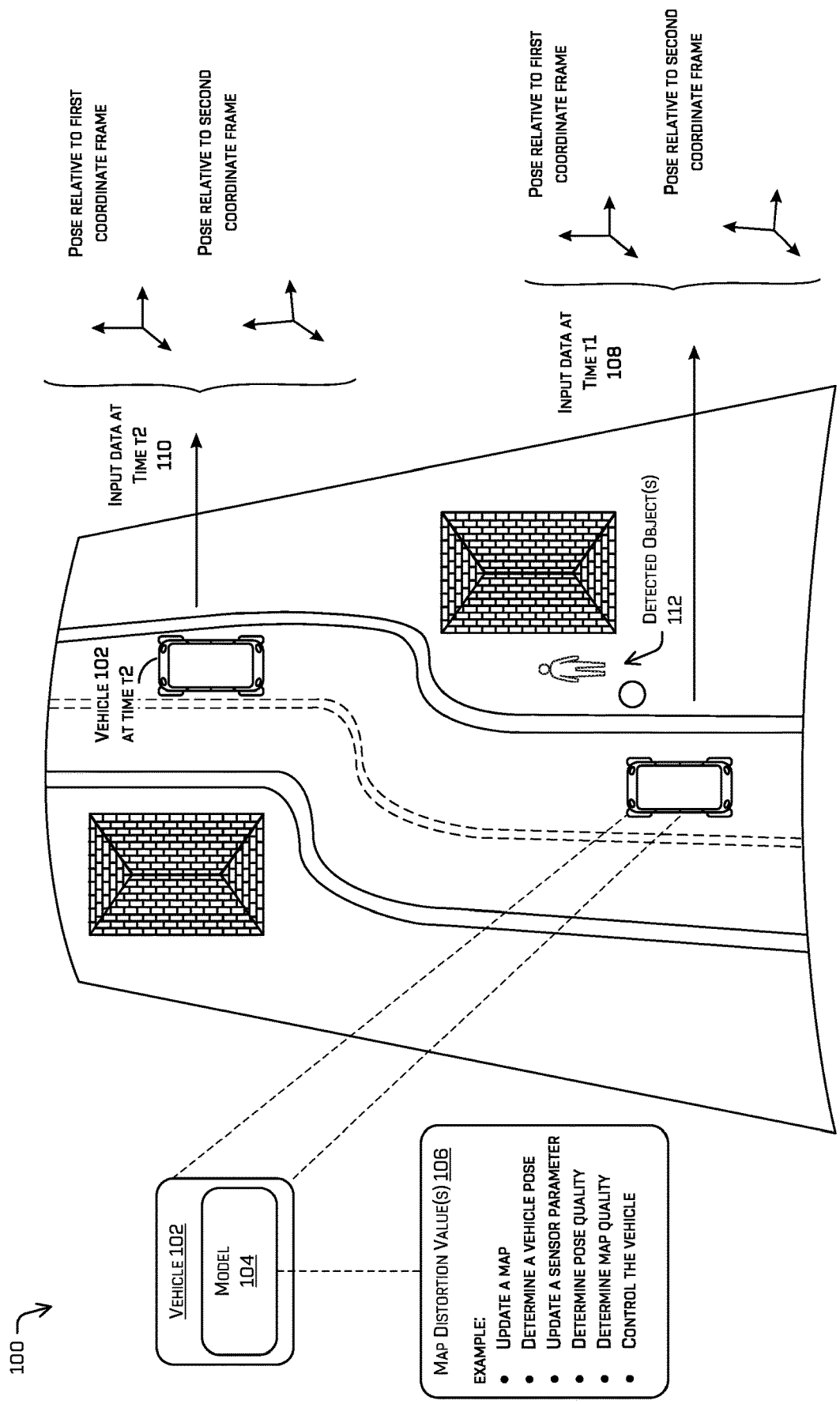
FIG. 1 is an illustration of an example environment, in which an example vehicle applies a model to predict a map distortion value.

Techniques for determining and/or accounting for map distortion, such as distortion caused by measurement errors, are discussed herein. For instance, a machine learned model estimates map distortion to represent a misalignment between a map frame and an inertial frame. In some examples, the map distortion estimate may be used by a computing device to generate a map and/or to assess map quality. The map distortion estimate output by the machine learned model may also or instead be sent to a vehicle computing system that is configured to determine a vehicle pose based on the map distortion estimate and/or incorporate any map distortion estimate or quality value in one or more additional processes. Using the techniques described herein, a vehicle may receive a map distortion value from a model usable by the vehicle to quickly and/or preemptively navigate the vehicle in an environment, thereby improving safety of the vehicle.

By way of example and not limitation, the map frame may include distortion due to one or more errors during the mapping process. To illustrate, a substantially flat and horizontal region of an environment represented by a map is assumed to have gravity point in a same direction (e.g., pointing down all the time). However, because of map distortion the map ground plane may not be flat and horizontal and may include areas in which the map ground plane is slightly tilted in various ways relative to an actual ground plane in the environment. As illustrated in some examples, a normal vector to the map based at least in part on a map measurement may diverge from a gravity measurement (or other reference vector) rather than pointing straight down. Such divergences may be represented as a map distortion. In some examples, however, directly measuring gravity by a sensor may be difficult because any such measurements (e.g., by an accelerometer or other sensor) may comprise noise, and/or biases.

Using the techniques described herein, a model may process measurements over a period of time to estimate map distortion, vehicle pose, and/or biases (e.g., acceleration bias, gravity bias, and so on). In various examples described herein, such distortions may be model regions of the map as locally flat with slowly varying distortion with respect to other regions of the environment. In various examples, outputting a map distortion value by the model can enable treating map distortion without modifying a noise model that affects other sensor measurements. That is, noise associated with different sensor measurements may be modeled separately as opposed to modelling the noise of multiple sensors collectively. Further, in examples when a vehicle is uncertain of whether to use a sensor measurement (e.g., such as from a localizer), the map distortion value may be used to determine a vehicle pose.

Different areas of a map may be associated with different magnitudes of map distortion. To illustrate, consider the following analogy between a map and sheet metal. Sheet metal bent or warped into a shape appears shiny and free of errors when viewed locally over smaller areas such as a flat surface. However, when viewing the shape of the sheet metal globally, bent areas of the sheet metal reflect distortion. Similarly, a map may appear to be free of map distortion locally but still have different levels of map distortion globally. In some examples, a vehicle may use a map to navigate in an environment and as the vehicle travels relatively smaller distances from a current position, the map may appear relatively accurate and free of errors. However, as the vehicle travels over larger distances from the current position, the map distortion can add up thereby introducing error in vehicle position determined by the vehicle. Thus, it's important to consider map distortion across different areas of a map to safely and accurately control the vehicle in the environment.

In some examples, the techniques for determining map distortion can include applying and/or training a model to predict or otherwise determine an error between a map frame (e.g., a coordinate frame based on a map) and an inertial frame (e.g., a local Universal Transverse Mercator coordinate frame). The model may identify the error based at least in part on, for example, a comparison between a vehicle pose relative to the inertial frame and another vehicle pose relative to the map frame. The model may output, in various examples, a map distortion value indicative of a difference in a direction, a location, a pose, and/or an orientation between a vector of a map frame and a vector of an inertial frame. In some examples, a model may receive data (e.g., sensor data, map data, inertial data, and so on) and output a map distortion value that represents a 6 Degree-of Freedom (6DoF) transform between the map frame and the inertial frame. Additional details for determining map distortion are discussed throughout this disclosure.

In various examples, the map distortion value may be determined by a model associated with an autonomous vehicle navigating in an environment. A vehicle computing system of the autonomous vehicle may receive sensor data from one or more sensors (e.g., an inertial measurement unit (IMU), an accelerometer, a gyroscope, a magnetometer, or a combination thereof) and determine, based on the sensor data, a vehicle state (e.g., a position, an orientation, and/or a trajectory of the vehicle, to name a few) at a first time and/or associated with a first location. The model may output a first map distortion value representing a first vehicle state at the first time and/or the first location, and predict a second map distortion value representing a second vehicle state at a second time and/or second location based at least in part on the first map distortion value. For example, based on a difference between a trajectory of the vehicle relative to the map frame and a trajectory of the vehicle relative to the inertial frame at the first time, the model can predict or otherwise determine a second map distortion value associated with a position of the vehicle at the second time. A vehicle computing system can use the first map distortion value and/or the second map distortion value, for instance, during vehicle pose estimation to reconcile sensor measurements from one or more sensors (e.g., an acceleration measurement from an IMU) with an orientation associated with the map measurements. By reconciling sensor measurements relative to map measurements using the techniques described herein, vehicle pose estimations are improved, which further improves an ability of the vehicle to safely navigate in the environment.

In some examples, a model may be implemented to determine a region(s) of a map having a likelihood for map distortion. For instance, based on stored or historical map distortion data associated with different regions of the map, the model may be trained to identify or predict an area of the map having a high probability for map distortion (e.g., a region of the map representing data from two or more sensors, a region distorted during generation of the map, and so on). A computing device may associate a map distortion value with the area of the map based at least in part on the likelihood. In various examples, the computing device may send the map with associated map distortion values for different areas to one or more vehicles for use in navigating the one or more vehicles.

As mentioned above, in some examples the map distortion value can be used by a computing device as a metric for map quality (e.g., determining a confidence level that the map accurately represents the environment). For example, the computing device may guide a vehicle using a map (e.g., process map data associated with the map) based at least in part on the map distortion value associated with the map (or specific locations of the map). In some examples, the map distortion value and/or associated map may be usable by the computing device for processing when the map distortion value meets or exceeds a map distortion threshold. In various examples, the map may be usable for navigation by one or more vehicles in a fleet of vehicles and may be updated based on map distortion value(s) measured from any of the one or more vehicles in the fleet.

In various examples, the map distortion value output by the model may be used to generate and/or modify a map (e.g., provide real-time map generation and/or periodic updates to an offline map used by one or more autonomous vehicles in a fleet). For example, a map may be updated by the vehicle computing system during navigation and/or by a remote computing device that receives map distortion value(s) from the one or more autonomous vehicles.

A vehicle computing system may determine an instruction to guide a vehicle in an environment based at least in part on the map distortion value. In various examples, the instruction may represent steering, braking, and/or acceleration information as non-limiting examples, though other controls (of internal and/or external components) of the vehicle are contemplated. In some examples, the instruction may represent a trajectory (e.g., direction, speed, acceleration, etc.) usable by the vehicle to traverse the environment. By way of example and not limitation, an instruction may be generated by the computing device based on the map distortion value and communicated to a planning component of the vehicle thereby improving vehicle safety by enabling the planning component to determine a trajectory for the vehicle that is based, at least in part, on the map distortion value.

In various examples, the map distortion value may be used by a vehicle computing system to improve accuracy of sensor measurements by taking into account a misalignment between two coordinate systems. For example, the vehicle computing system may receive one or more map distortion values from a model that predicts map distortion represented as differences in gravity at different locations of the map (e.g., as opposed to assuming that gravity will be constant across all locations). In some examples, an output by an IMU may be adjusted based on the one or more map distortion values prior to the output by the IMU being used in other computations (e.g., determining a vehicle trajectory, a vehicle pose, or the like). By implementing a map distortion model as described herein, errors in measurements from sensors that are dependent upon gravity can be reduced thereby improving predictions by other systems that rely on sensor measurements.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data). In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example map distortion model (model 104) may determine map distortion. A vehicle computing system (e.g., vehicle computing system 204) may implement the map distortion model of the vehicle 102. While described as a separate system, in some examples, the map distortion techniques described herein may be implemented by other vehicle systems, components, and/or computing devices. For example, and as will be described in further detail with regard to FIG. 2, the map distortion techniques described herein may be implemented at least partially by or in association with a localization component 220, a perception component 222, a planning component 224, and/or a planning component 224.

FIG. 1 illustrates the vehicle 102 at a first time (t1) (e.g., a first location) and at a second time (t2) (e.g., a second location) comprising the model 104 to determine map distortion values at times t1, t2, to (where n is an integer greater than 1) in the environment 100. The environment 100 may be representative of a three dimensional map of an environment surrounding the vehicle 102. The model 104 can be configured to determine a map distortion value 106 for respective times based at least on input data such as input data 108 at time t1 and/or input data 110 at time t2. In some examples, the input data may comprise first data associated with a vehicle pose relative to a first coordinate frame and second data associated with another vehicle pose relative to a second coordinate frame. In some examples, the first data and the second data may be associated with a same sensor (e.g., a lidar sensor, an IMU, a camera, and the like), different sensors (e.g., a lidar sensor and an IMU), and/or map data. In a non-limiting example, the input data may comprise map data associated with a map frame (e.g., a first coordinate frame based on a map having x, y, and z coordinates) and inertial data associated with an inertial frame (e.g., a second coordinate frame based on gravity having pitch, roll, and yaw coordinates).

In some examples, one or more of a position or an orientation of the vehicle 102 in the first coordinate frame and/or the second coordinate frame may comprise a representation having six degrees of freedom (6DoF) (e.g., an x-, y-, z-, roll, pitch, yaw). In such examples, the model 104 may output a map distortion value that represents a 6DoF transform between the vehicle pose in the map frame and the vehicle pose in the inertial frame.

In various examples, the vehicle computing system may be configured to receive sensor data representing the environment 100, such as via a perception component (e.g., the perception component 222). In some examples, the vehicle computing system may detect, infer, estimate, or otherwise determine a vector associated with gravity based on sensor data received from one or more sensors. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data, such as data associated with gravity in the environment 100. In some examples, the vehicle computing system may be configured to detect an object in the environment 100, such as object 112 (e.g., a pedestrian).

In various examples, the vehicle computing system may receive sensor data (e.g., image data, lidar data, and the like) and map data of the environment 100 associated with the vehicle 102. In various examples, the vehicle computing system may determine a vehicle pose relative to an inertial frame associated with time t1. The vehicle computing system may also determine, based at least in part on the map data, a second value indicative of the vehicle pose relative to a map frame associated with time t1. In some examples, the first value and the second value may be input into the model 104 to output a map distortion value indicative of distortion or misalignment between the map frame and the inertial frame associated with the time t1. For instance, the model may output a map distortion value indicative of a difference in a direction, a location, a pose, and/or an orientation between a first vector of a map frame and a second vector of an inertial frame. The first vector and/or the second vector may be associated with gravity, a vehicle state, and/or a sensor.

In various examples, the vehicle computing system may determine a map distortion value based at least in part on a difference between first vehicle motion relative to a first map reference frame at a first time and second vehicle motion relative to a first inertial reference frame at a first time. For instance, the model may identify a difference or misalignment in vehicle motion between a map reference frame and inertial reference frame and output a map distortion value representing the difference.

In some examples, the vehicle computing system may receive sensor data from two different sensors (e.g., a lidar sensor and an image sensor) and determine a map distortion value indicating distortion between a map based on the lidar sensor and a map based on the image sensor. For instance, the vehicle computing system may receive lidar data and image data as an input and output a value indicative of a difference between lidar map distortion and image map distortion. In this way, maps based on different sensor modalities may be compared to determine map distortion specific to each sensor modality. Output(s) by a model implemented by the vehicle computing system may be used to improve accuracy of sensor measurements by mitigating sensor calibration (e.g., modifying and/or updating a sensor parameter to improve calibration of the sensor, updating a bias estimation value to reduce "noise", etc.).

In some examples, each of the first coordinate frame and the second coordinate frame of the input 108 and/or the input 110 may be associated with a map frame and/or an inertial frame. For example, the first coordinate frame and the second coordinate frame may be associated with map frames of different sensors. In other examples, the first coordinate frame may be associated with a map frame and the second coordinate frame may be associated with an inertial frame.

The map distortion value 106 can be used by the vehicle computing system in a variety of ways including but not limited to determining, another map distortion value representing a second distortion between a second map frame and a second inertial frame associated with the time t2. For instance, the model 104 may implement a sliding window filter to determine map distortion values at times t2, t3, to in the environment 100.

In some examples, the vehicle computing system may determine a difference between the first map distortion value and the second map distortion value, and based at least in part on the difference, determine a map quality value representative of an impact of the difference between the first map distortion value and the second map distortion value. In various examples, a computing device may update a map associated with the map frame based at least in part on the map quality value. That is, the map quality value may be used by the computing device to improve accuracy of a map having errors caused during generation of the map and/or errors caused by a sensor measurement (e.g., a gravity value).

The map distortion value determined by the model 104 may also or instead be considered during vehicle planning (e.g., planning component 224) thereby improving vehicle safety as a vehicle navigates in the environment. For instance, the planning component of an autonomous vehicle may plan an action (e.g., determine a trajectory, navigate to a location, etc.) based at least in part on information associated with the map distortion value and/or a map updated based at least in part on the map distortion value.

The map distortion value 106 can also or instead be used by the vehicle computing system to determine a vehicle position, orientation, and/or pose at time t1 using the input data 108 or at time t2 using the input data 108 and the input data 110.

In various examples, the vehicle computing system may update, based at least in part on the map distortion value(s) 106, a sensor parameter (e.g., a measurement bias, drift, and so on) associated with a sensor. Measurements by sensors are associated with bias values to represent errors in estimations. Sensor bias estimations by the vehicle computing system may be improved by identifying and removing a portion of the sensor bias estimations due to gravity. In this way, a portion of an IMU bias value due to gravity can be identified by the model and removed so that the resulting bias estimations are more accurate. For instance, an IMU bias value can represent noise or errors in estimations from multiple sources (e.g., wheel speed, gravity, pose, and so on). The IMU bias value (or other bias values associated with the vehicle computing system) is more accurate by removing errors associated with gravity (e.g., a gravity bias) from the IMU bias value instead of providing measurements that adjust the IMU bias value to account for map distortion.

In various examples, the vehicle computing system may use the map distortion value(s) 106 to control steering, acceleration, braking, and other systems of the vehicle 102. In various examples, a planning component and/or a perception component of the vehicle computing system may determine one or more predicted object trajectories based on the output (e.g., map distortion at one or more locations of a map) from the model 104. In some examples, the trajectories may include any number of potential paths in which the object 112 may travel from a current position (e.g., at the time of perception) and/or based on a direction of travel. In some examples, a potential path for the object 112 may include remaining stationary. In such an example, the corresponding trajectory may represent little to no motion. Additional details of controlling steering, acceleration, braking, and other systems of the vehicle is described in U.S. patent application Ser. No. 16/251,788, filed on Jan. 18, 2019, entitled "Vehicle Control," which is incorporated herein by reference in its entirety.

By way of example and not limitation, the vehicle computing system may determine, based at least in part on the map distortion value, a pose quality value associated with the distortion between the first and second coordinate frames and determine, based at least in part on the pose quality value meeting or exceeding a pose quality threshold, that a vehicle pose is usable by a vehicle controller to control operation of the vehicle.

In various examples, an IMU sensor of a vehicle may infer, capture, or otherwise determine a gravity vector that is local to the vehicle (e.g., gravity is detected with respect to a vehicle coordinate system). As the vehicle changes position in the environment and moves a distance from the area at which the vehicle captured the gravity vector, a localization component of the vehicle uses the gravity vector to determine the vehicle pose with respect to a map coordinate system. The gravity vector from the IMU sensor is typically applied to all areas of the map. However, some areas of the map may have distortion caused during generation, optimization, compression, decimation, etc. of the map and thus a vehicle position, pose, and/or orientation that depends from the map coordinate system will therefore have some error associated with the gravity vector. By outputting a map distortion value from a model, the vehicle computing system can compensate for the errors associated with the map by predicting map distortion values that represent different areas of the map including distorted areas of the map caused by map generation (e.g., areas representing fused sensor data). In this way, the model can be thought of as transforming a local gravity measurement to align gravity globally over a three dimensional map of an environment.

To further illustrate map distortion, consider the following analogy to sheet metal. Sheet metal bent or warped into a shape appears shiny and free of errors when viewed locally over smaller areas. That is, a substantially flat surface of the sheet metal, like a flat roadway of a map, may appear to be free of any error. However, when viewing the shape of the sheet metal globally, bent areas of the sheet metal reflect distortion that may be thought of as global distortion. Like sheet metal that appears error free over most areas but still has distortion, as a vehicle travels at small distances (e.g., tens of meters) from a current vehicle position, the map may be relatively accurate and free of errors. However, over larger distances (e.g. over a thousand meters) of travel from the current vehicle position, the map distortion can add up thereby introducing error in vehicle position. Thus, it's important to consider map distortion to safely and accurately control the vehicle in the environment. Using the techniques as described herein, a model may be implemented by a vehicle computing system to align a local gravity vector determined by the vehicle globally across portions of the map (e.g., a map distortion value may be associated with different regions of the map including regions identified as being likely to have distortions).

By way of example and without limitation, sensor data may be captured every 10 meters as the vehicle changes location. However, as the vehicle increases distance from the location at which the IMU sensor captures the gravity vector, distortion in the map may change based on changes in pose of the vehicle relative to a ground surface. The map distortion value from a model may be used by a vehicle computing system to improve pose estimates for a vehicle even in locations of a map that may comprise map distortion.

Yet another example of using the map distortion value output by the model includes providing map distortion information to a planning component in examples when the localization measurement from a localization component is not captured or is unable to be used. For example, the localization component may reject the measurement that is unclear such as when the vehicle travels in a tunnel or down a highway with limited objects or reference for determining the vehicle location. In another example the vehicle may be traveling adjacent a large truck that obscures or prevents sensors of the vehicle from capturing sufficient data to determine the location of the vehicle relative to the map. In such examples, the vehicle computing system may use the map distortion value to navigate the vehicle during instances when the localization component does not provide useful data.

Figure 2:
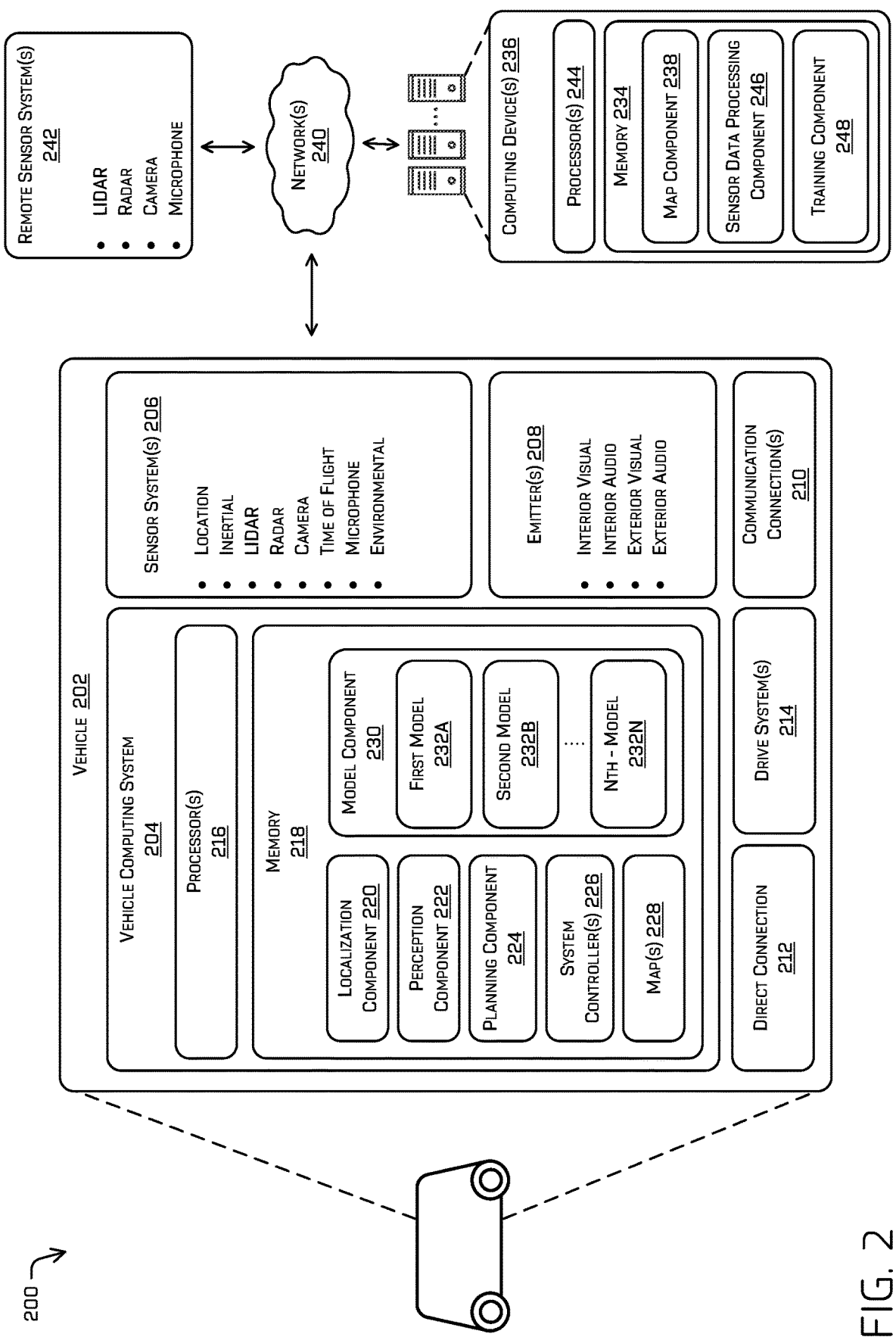
FIG. 2 is a block diagram of an example system for implementing the techniques described herein.

FIG. 2 is a block diagram of an example system 200 for implementing the techniques described herein. In at least one example, the system 200 may include a vehicle, such as vehicle 202.

The vehicle 202 may include a vehicle computing system 204, one or more sensor systems 206, one or more emitters 208, one or more communication connections 210, at least one direct connection 212, and one or more drive systems 214.

The vehicle computing system 204 may include one or more processors 216 and memory 218 communicatively coupled with the one or more processors 216. In the illustrated example, the vehicle 202 is an autonomous vehicle; however, the vehicle 202 could be any other type of vehicle, such as a semi-autonomous vehicle, or any other system having at least an image capture device (e.g., a camera enabled smartphone). In the illustrated example, the memory 218 of the vehicle computing system 204 stores a localization component 220, a perception component 222, a planning component 224, one or more system controllers 226, one or more maps 228, and a model component 230 including one or more models, such as a first model 232A, a second model 232B, up to an Nth model 232N (collectively "models 232"), where N can be any integer greater than 1. Though depicted in FIG. 2 as residing in the memory 218 for illustrative purposes, it is contemplated that the localization component 220, the perception component 222, the planning component 224, the one or more system controllers 226, the one or more maps 228, and/or the model component 230 including the models 232 may additionally, or alternatively, be accessible to the vehicle 202 (e.g., stored on, or otherwise accessible by, memory remote from the vehicle 202, such as, for example, on memory 234 of a remote computing device 236).

In at least one example, the localization component 220 may include functionality to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment, such as from map(s) 228 and/or map component 238, and may continuously determine a location and/or orientation of the autonomous vehicle within the map. In some instances, the localization component 220 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 220 may provide data to various components of the vehicle 202 to determine an initial position of an autonomous vehicle for determining the relevance of an object to the vehicle 202, as discussed herein.

In some examples, the localization component 220 may include functionality to receive data from the sensor system(s) 206 to determine gravity (e.g., a gravity vector) at the vehicle 202. For instance, the localization component 220 may be configured to receive sensor data and determine a gravity vector associated with an inertial frame and/or a map frame.

In some instances, the perception component 222 may include functionality to perform object detection, segmentation, and/or classification. In some examples, the perception component 222 may provide processed sensor data that indicates a presence of an object (e.g., entity) that is proximate to the vehicle 202 and/or a classification of the object as an object type (e.g., car, pedestrian, cyclist, animal, building, tree, road surface, curb, sidewalk, unknown, etc.). In some examples, the perception component 222 may provide processed sensor data that indicates a presence of a stationary entity that is proximate to the vehicle 202 and/or a classification of the stationary entity as a type (e.g., building, tree, road surface, curb, sidewalk, unknown, etc.). In additional or alternative examples, the perception component 222 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In some examples, the planning component 224 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 202. In some examples, a prediction component may measure a trace of an object and generate a trajectory for the object based on observed and predicted behavior.

In at least one example, the vehicle computing system 204 may include one or more system controllers 226, which may be configured to control steering, propulsion, braking, safety, emitters, communication, and other systems of the vehicle 202. The system controller(s) 226 may communicate with and/or control corresponding systems of the drive system(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 202 may be controlled based at least in part on the map(s) 228. That is, the map(s) 228 may be used in connection with the localization component 220, the perception component 222, and/or the planning component 224 to determine a location of the vehicle 202, detect or determine gravity, detect objects in an environment, generate routes, determine actions and/or trajectories to navigate within an environment.

In some examples, the one or more maps 228 may be stored on a remote computing device(s) (such as the computing device(s) 236) accessible via network(s) 240. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

As illustrated in FIG. 2, the vehicle computing system 204 may include a model component 230. The model component 230 may be configured to determine map distortion associated with a gravity vector. In various examples, the model component 230 may receive position and/or orientation information associated with the vehicle from the localization component 220, the perception component 222, and/or from the sensor system(s) 206. In some examples, the model component 230 may receive map data from the localization component 220, the perception component 222, the maps 228, and/or the sensor system(s) 206. While shown separately in FIG. 2, the model component 230 could be part of the localization component 220, the perception component 222, the planning component 224, or other component(s) of the vehicle 202.

In various examples, the model component 230 may send outputs from the first model 232A, the second model 232B, and/or the Nth model 232N that are used by the planning component 224 to generate one or more planned trajectories for the vehicle to follow in an environment. In some examples, the planning component 224 may determine one or more actions (e.g., reference actions and/or sub-actions) for the vehicle 202. In some examples, the model component 230 may be configured to output a map distortion value usable to update a map and/or determine map quality to the maps 228 and/or the map component 238.

In some examples, the model component 230 may communicate an output to the perception component 222 to cause an update to one or more parameters (e.g., bias values, drift values, and the like) associated with the sensor system(s) 206. For instance, a sensor measurement bias (e.g., an error in a sensor measurement) may include an IMU bias value to reflect an error in an IMU that measures inertial characteristics of the vehicle. By receiving the map distortion value from the model component 230, the perception component 222 may update sensor measurements (e.g., reduce an amount of IMU bias by removing a portion of the IMU bias caused by gravity) made by the IMU to account for map distortion between a map frame and an inertial frame.

In some instances, the perception component 222 may include functionality to perform gravity detection (or capture other data from which a gravity vector can be inferred, estimated, or otherwise determined) and/or to determine a vehicle state. In some examples, the perception component 222 may provide processed sensor data that indicates a presence of a magnitude of gravity proximate to the vehicle 202 and/or indicates a vehicle state (e.g., one or more of a position, a velocity, an acceleration, a trajectory, etc. of the vehicle 202). In some examples, the perception component 222 may provide the processed sensor data as an input into the model component 230.

Models included in the model component 230 may predict, based at least in part on a first map distortion value associated with a first time, a second map distortion value associated with a second time different from the first time (e.g., before or after the first time). In some examples, the first model 232A, the second model 232B, and/or the Nth model 232N may predict a second map distortion value for a location of the vehicle at a second time prior to the vehicle arriving at the location such that the vehicle can use the second map distortion value to process sensor measurements during capture. For example, sensor data measured by one or more sensors of the sensor system(s) 206 may be updated to account for map distortion prior to the sensor data being shared with other components (e.g., the planning component 224) of the vehicle that may control various actions of the vehicle.

In some examples, a single model may be configured to perform the processing associated with the first model 232A, the second model 232B, and so on. By reconciling sensor measurements from one or more sensors with an orientation associated with map measurements using the techniques described herein, vehicle pose estimations, map accuracy, and/or sensor calibration are improved, which further improves an ability of the vehicle to safely navigate in the environment.

In various examples, the model component 230 may utilize machine learning techniques to determine a map distortion value, as described with respect to FIG. 1 and elsewhere. In such examples, machine learning algorithms may be trained to determine a difference between a gravity vector of a map frame and a gravity vector of an inertial frame. In various examples, the gravity vector in the map frame and/or the inertial frame may be associated with a position and/or an orientation of the vehicle relative to the respective frame.

In some examples, the model component 230 may receive data (e.g., sensor data, map data, inertial data, and so on) and output a map distortion value that represents a 6 Degree-of-Freedom (6DoF) transform between the map frame and the inertial frame. In various examples, the output by the model component 230 may comprise information regarding uncertainty, a covariance, a transformation, an interpolation, an extrapolation, and/or an average between information associated with the map frame and information associated with the inertial frame.

In some examples, the model component 230 may access stored data associated with different regions of the map. For instance, data representative of map distortion values for different regions of a map (e.g., data correlating map distortion values change over time and/or space) may be received by the model component 230 from memory or a database. The model component 230 may also or instead be trained to identify or predict an area of the map having a high probability for map distortion (e.g., a region distorted during generation of the map, a region of the map representing data from two or more sensors, and so on). In some examples, the model component 230 may determine a map distortion value for one or more areas of the map based at least in part on the likelihood of each of the areas to have map distortion (e.g., map distortion values may be determined for regions having a higher likelihood of map distortion relative to other regions.

In various examples, the model component 230 may send the map distortion values associated with different map regions to another vehicle for use in navigating by the other vehicle (e.g., another vehicle in a fleet of vehicles). In some examples, the model component 230 may output a map distortion value indicative of distortion between a map frame and an inertial frame for a location that the vehicle 202 (or another vehicle) plans to travel in the future. That is, a map distortion value can be shared with a vehicle prior to the vehicle sensing gravity at the location (e.g., receiving sensor data at the location). Outputs by the model component 230 may be used to predict a map distortion value at a future time and/or for a certain location in a map.

As can be understood, the components discussed herein (e.g., the localization component 220, the perception component 222, the planning component 224, the one or more system controllers 226, the one or more maps 228, the model component 230 including the models 232 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 218 (and the memory 234, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 may include multiple instances of each of these or other types of sensors. For instance, the lidar sensors may include individual lidar sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing system 204. Additionally, or in the alternative, the sensor system(s) 206 may send sensor data, via the one or more networks 240, to the one or more computing device(s) 236 at a particular frequency, after a lapse of a predetermined period of time, in near real-time, etc. In some examples, the model component 230 may receive sensor data from one or more of the sensor system(s) 206.

The vehicle 202 may also include one or more emitters 208 for emitting light and/or sound. The emitters 208 may include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 may also include one or more communication connections 210 that enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 210 may allow the vehicle to communicate with other nearby computing device(s) (e.g., remote computing device 236, other nearby vehicles, etc.) and/or one or more remote sensor system(s) 242 for receiving sensor data. The communication connection(s) 210 also enable the vehicle 202 to communicate with a remote teleoperations computing device or other remote services.

The communication connection(s) 210 may include physical and/or logical interfaces for connecting the vehicle computing system 204 to another computing device or a network, such as network(s) 240. For example, the communication connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive systems 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor systems to detect conditions of the drive system(s) 214 and/or the surroundings of the vehicle 202. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 214. Furthermore, the drive system(s) 214 may also include one or more communication connection(s) that enable communication by the respective drive system with one or more other local or remote computing device(s).

In at least one example, the direct connection 212 may provide a physical interface to couple the one or more drive system(s) 214 with the body of the vehicle 202. For example, the direct connection 212 may allow the transfer of energy, fluids, air, data, etc. between the drive system(s) 214 and the vehicle. In some instances, the direct connection 212 may further releasably secure the drive system(s) 214 to the body of the vehicle 202.

In at least one example, the localization component 220, the perception component 222, the planning component 224, the one or more system controllers 226, the one or more maps 228, and the model component 230, may process sensor data, as described above, and may send their respective outputs, over the one or more network(s) 240, to the computing device(s) 236. In at least one example, the localization component 220, the perception component 222, the planning component 224, the one or more system controllers 226, the one or more maps 228, and the model component 230 may send their respective outputs to the remote computing device(s) 236 at a particular frequency, after a lapse of a predetermined period of time, in near real-time, etc.

In some examples, the vehicle 202 may send sensor data to the computing device(s) 236 via the network(s) 240. In some examples, the vehicle 202 may receive sensor data from the computing device(s) 236 and/or remote sensor system(s) 242 via the network(s) 240. The sensor data may include raw sensor data and/or processed sensor data and/or representations of sensor data. In some examples, the sensor data (raw or processed) may be sent and/or received as one or more log files.

The computing device(s) 236 may include processor(s) 244 and a memory 234 storing the map component 238, a sensor data processing component 246, and a training component 248. In some examples, the map component 238 may include functionality to generate maps of various resolutions. In such examples, the map component 238 may send one or more maps to the vehicle computing system 204 for navigational purposes. In various examples, the sensor data processing component 246 may be configured to receive data from one or more remote sensors, such as sensor system(s) 206 and/or remote sensor system(s) 242. In some examples, the sensor data processing component 246 may be configured to process the data and send processed sensor data to the vehicle computing system 204, such as for use by the model component 230 (e.g., the first model 232A, the second model 232B, and/or the Nth model 232N). In some examples, the sensor data processing component 246 may be configured to send raw sensor data to the vehicle computing system 204. In some examples, the vehicle computing system 204 may be configured to send gravity information (e.g., gravity data indicating a gravity vector relative to a map frame and/or an inertial frame) to the vehicle computing system 204.

In some instances, the training component 248 can include functionality to train a machine learning model to output map distortion values. For example, the training component 248 can receive data that represents a vehicle traversing through an environment for a period of time, such as 0.1 milliseconds, 1 second, 3, seconds, 5 seconds, 7 seconds, and the like. At least a portion of the data can be used as an input to train the machine learning model. As a non-limiting example, sensor data, image data, map data, inertia data, vehicle state data, or a combination thereof may be input into the machine learned model. Thus, by providing data where the vehicle traverses an environment, the training component 248 can be trained to output map distortion values associated with a map of the environment, as discussed herein.

In some examples, the training component 248 can include training data that has been generated by a simulator. For example, simulated training data can represent examples where a vehicle collides with an object in an environment or nearly collides with an object in an environment, to provide additional training examples.

In some examples, functionality provided by the training component 248 may be included and/or performed by the vehicle computing system 204. Additional details of the training component 248 and examples of data for training are discussed below in connection with FIG. 3, as well as throughout this disclosure.

The processor(s) 216 of the vehicle 202 and the processor(s) 244 of the computing device(s) 236 may be any suitable processor capable of executing instructions to process data and perform operations as described herein. By way of example and not limitation, the processor(s) 216 and 244 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and memory 234 are examples of non-transitory computer-readable media. The memory 218 and memory 234 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 218 and memory 234 may include at least a working memory and a storage memory. For example, the working memory may be a high-speed memory of limited capacity (e.g., cache memory) that is used for storing data to be operated on by the processor(s) 216 and 244. In some instances, the memory 218 and memory 234 may include a storage memory that may be a lower-speed memory of relatively large capacity that is used for long-term storage of data. In some cases, the processor(s) 216 and 244 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 may be associated with the computing device(s) 236 and/or components of the computing device(s) 236 may be associated with the vehicle 202. That is, the vehicle 202 may perform one or more of the functions associated with the computing device(s) 236, and vice versa. For instance, either the vehicle 202 and the computing device(s) 236 may perform training operations relating to one or more of the models described herein.

Figure 3:
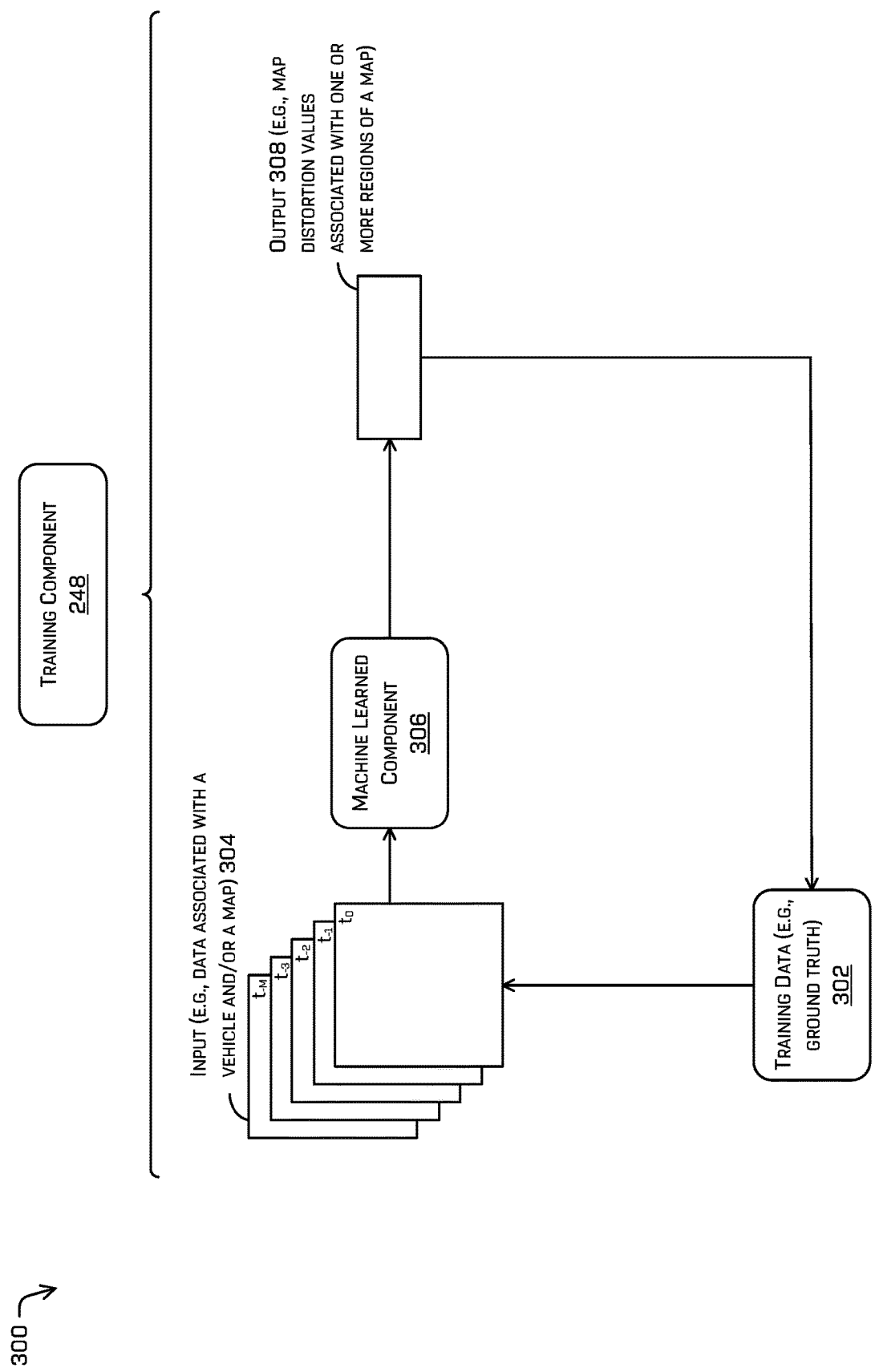
FIG. 3 depicts a block diagram of an example training component for training a machine learned model to implement the techniques described herein.

FIG. 3 depicts a block diagram 300 of an example training component (training component 248 of FIG. 2) for training a machine learned model to implement the techniques described herein. A vehicle computing system (e.g., vehicle computing system 204) and/or the computing device(s) 236 may implement the attribute determination model. While described as a separate system, in some examples, the attribute determination techniques described herein may be implemented by other vehicle systems, components, and/or computing devices. For example, and as will be described in further detail with regard to FIG. 2, the attribute determination techniques described herein may be implemented at least partially by or in association with a model component 230 and/or a planning component 224.

Training data 302 represents a ground truth of all map distortion associated with a map representing the environment. For example, a ground truth may comprise labeled data describing an expected misalignment between vectors of different coordinate systems or coordinate frames associated with the vehicle. As explained in more detail below, ground truth data may be compared against an output (e.g., a map distortion value) of a model for use in training. Differences in the ground truth data and the output may be determined based at least in part on future sensor measurements (which may in some examples be determined from log data). During training, a loss function may be used to represent a difference in an expected output and an actual output and may be backpropagated through the model to determine which parameters of the model to augment or alter for improving the loss function (minimizing a difference between the expected output and the actual output). The training data 302 may be used for training the machine learned component 306, for example.

In some examples, training data 302 can comprise data captured by a vehicle as it traverses through an environment (e.g., vehicle 102). Such training data can include action data, which may represent actions performed by an autonomous vehicle, if such an autonomous vehicle captured the training data 302. In some examples, an input 304 can be based at least in part on the training data 302.

The input 304 comprising sensor data, image data, map data, vehicle state data, and/or inertial data can be input to the machine learned component 306. In various examples, the input 304 can comprise map data having different regions in which each region is associated with a map distortion value. In some examples, the input 304 can comprise location(s) of a vehicle over time in the map, as discussed herein. FIG. 3 illustrates input data at times t1, t2, t3, t4, . . . tn (where n is an integer greater than 1).

In some examples, data associated with different times in the input 304 may be input into corresponding models (e.g., copies of the machine learned component 306) such that the data is processed in parallel (e.g., at a substantially same time).

In some examples, the machine learned component 306 provides an output 308 indicative of map distortion (e.g., a difference, a location, a pose, or an orientation between a first vector in the map frame and a second vector in the inertial frame) associated with one or more regions of the map in the input 304. For example, the machine learned component 306 may determine one or more map distortion value(s) for a region(s) outside a sensing range of a vehicle, for instance.

In some examples, the output 308 from the machine learned component 306 can be compared against training data 302 (e.g., ground truth representing labeled data) for use in training. For instance, based at least in part on the comparison, parameter(s) associated with the machine learned component 306 can be augmented, altered, and/or updated. In some examples, operations performed by the training component 248 may be performed on another system, such as the vehicle computing system 204, and results of the training may be transferred to one or more vehicles in the environment (e.g., vehicle 202 or another vehicle in a fleet of vehicles).

Figure 4:
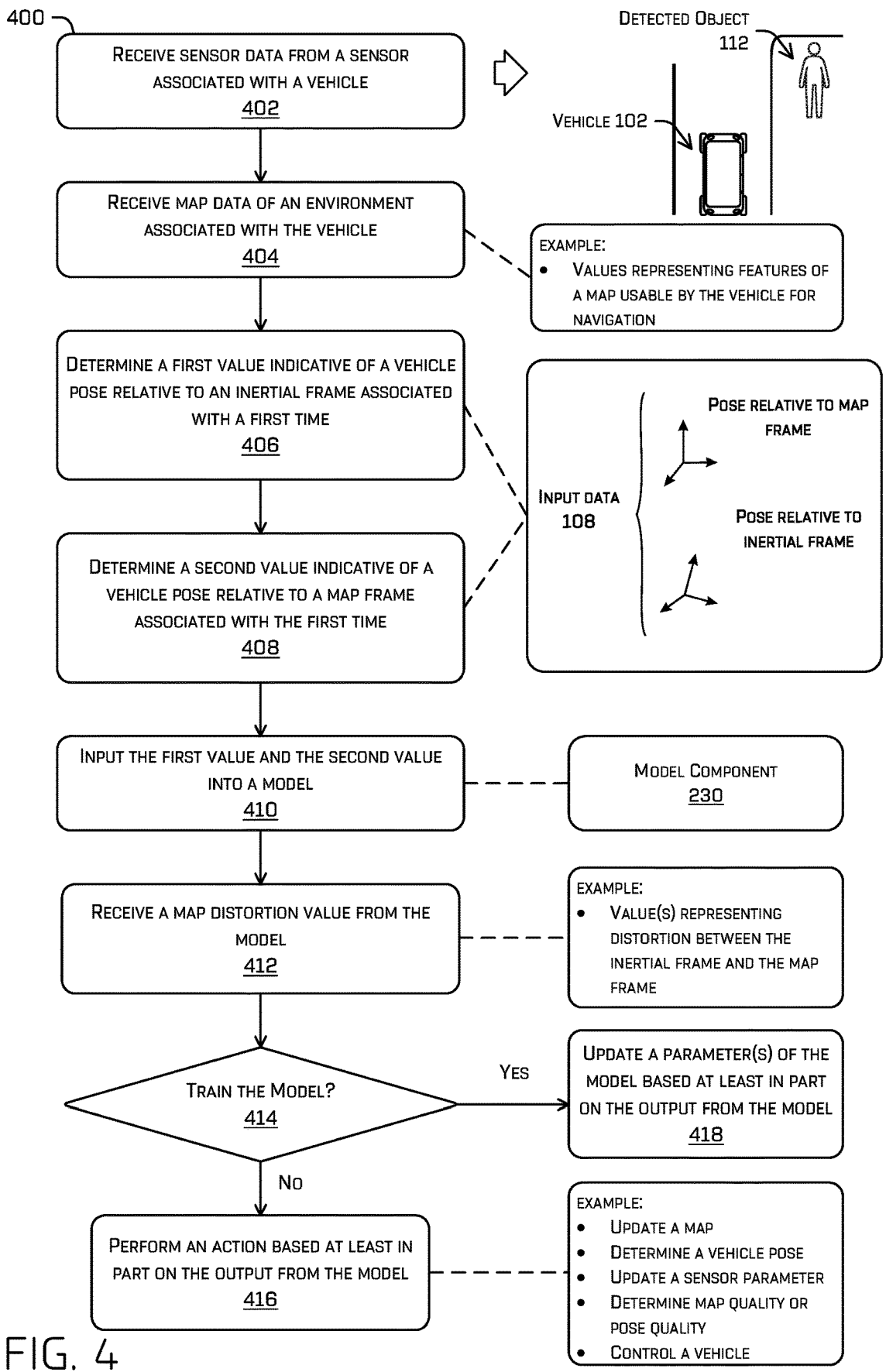
FIG. 4 is a flowchart depicting an example process for determining map distortion values using one or more models.

FIG. 4 illustrates example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 4 is a flowchart depicting an example process 400 for determining map distortion values using one or more models. Some or all of the process 400 may be performed by one or more components in FIG. 2, as described herein. For example, some or all of process 400 may be performed by the vehicle computing system 204 and/or the computing device(s) 236.

At operation 402, the process may include receiving sensor data from a sensor associated with a vehicle. The sensor data may comprise data representing vehicle information relative to an environment around a vehicle. Examples of such sensor data are discussed throughout this disclosure. For example, the sensor data may be associated with an IMU that is configured to measure a position, an orientation, and/or a pose of the vehicle relative to an inertial coordinate frame. The sensor data may be received from one or more sensors on the vehicle and/or from one or more remote sensors. In some examples, the map data may represent fixed features of an environment including but not limited to crosswalks, traffic signals, school zones, and the like.

In various examples, sensor measurements by the one or more sensors may utilize machine learned techniques. In such examples, one or more machine learned algorithms may be trained to determine a map distortion value based on sensor data.

In some examples, the operation 402 can include capturing sensor data using a plurality of sensors and fusing or combining the sensor data into a detail and informative representation of the environment.

At operation 404, the process may include receiving map data of an environment associated with the vehicle. For example, the vehicle computing system 204 may receive map data from the maps 228 and/or the computing device(s) 236.

At operation 406, the process may include determining, based at least in part on the sensor data, a first value indicative of a vehicle pose relative to an inertial frame associated with a first time. Examples of such determining of vehicle pose relative to the inertial frame are discussed throughout this disclosure. The inertial frame may be based at least in part on a measurement from an IMU (e.g., inertial measurement unit data). For instance, the vehicle computing system may determine a vehicle pose relative to an inertial coordinate frame. In at least some examples, the inertial coordinate frame can comprise one or more gravity vectors (or sets of values) associated with a current vehicle location and/or a predicted location of the vehicle in the future.

At operation 408, the process may include determining, based at least in part on the map data, a second value indicative of the vehicle pose relative to a map frame associated with the first time. Examples of such determining of vehicle pose relative to the map frame are discussed throughout this disclosure. The map frame may be based at least in part on detection(s) from one or more sensors (e.g., image data, lidar data, and the like). For instance, the vehicle computing system may determine a vehicle pose relative to a map coordinate frame. In at least some examples, the map coordinate frame can comprise one or more vectors (e.g., a gravity vector or sets of values) associated with a current vehicle location and/or a predicted location of the vehicle in the future.

At operation 410, the process may include inputting the first value and the second value into a machine learned model. For example, the model component 230 may receive the input 108 and/or the input 110.

At operation 412, the process may include receiving a map distortion value from the model representing distortion between the map frame and the inertial frame associated with the first time. For instance, a machine learned model may receive data (e.g., sensor data, map data, inertial data, and so on) and output a map distortion value that represents a 6 Degree-of Freedom (6DoF) transform between the map frame and the inertial frame. The vehicle computing system may implement one or more components to represent a vehicle pose at time i with respect to the inertial frame which can be expressed as:

$$_{inertial}T_{vehicle}(i) \qquad (1)$$

As can be understood, the function "inertial_T_vehicle (i)" indicates transformation (T) from the inertial frame to the vehicle pose at time i. The vehicle pose with respect to the map frame may be represented by:

$$_{map}T_{vehicle}(i) = {_{map}T_{inertial}(i) * _{inertial}T_{vehicle}(i)} \qquad (2)$$

As can be understood, the function "map_T_vehicle(i)" indicates transformation (T) from the map frame to the vehicle pose at time i. The model may relate the map distortion from time i to the map distortion of time i+1 as the difference between a relative pose and/or motion of the vehicle in the map frame and the relative pose and/or motion of the vehicle in the inertial frame, which may be expressed as:

$$\text{map\_distortion\_change}(i,i+1) = \log(_{inertial}T_{vehicle}^{-1}(i) * _{inertial}T_{vehicle}(i+1)) - \log(_{map}T_{vehicle}^{-1}(i) * _{map}T_{vehicle}(i+1)) \qquad (3)$$

A magnitude of the map distortion may be adjusted based at least in part on the vehicle pose at time i with respect to the inertial frame, which may be expressed as:

$$\text{map\_distortion\_prior}(i) = {_{inertial}T_{vehicle}^{-1}(i) * _{map}T_{inertial}(i) * _{inertial}T_{vehicle}(i)} \qquad (4)$$

Additional details for determining map distortion are discussed throughout this disclosure.

At operation 414, the process may include determining whether to train the model. For example, the operation 414 can include determining if a model is currently being trained, or whether the model has been trained previously. In some examples, a vehicle computing system may process data as part of a training operation, an inference operation, or a training operation and an inference operation in parallel. If the model is not being trained (e.g., "no" in the operation 414), the process can continue to operation 416 to perform an action based at least in part on the output by the model. For instance, as explained herein, the output may be used to perform at least one of: updating a map, determining a vehicle pose at a current time and/or a future time, updating a bias value associated with a sensor measurement, updating a sensor parameter, determining a map quality value, determining a pose quality value, and/or controlling a vehicle.

By way of example and not limitation, the vehicle computing system 204 may determine, based at least in part on the map distortion value, a pose quality value associated with the distortion between the map frame and the inertial frame and determine, based at least in part on the pose quality value meeting or exceeding a pose quality threshold, that a vehicle pose is usable by a vehicle controller to control operation of the vehicle. In some examples, the vehicle computing system 204 may determine the pose quality value based at least in part on whether the map distortion value is within a range of map distortion values. For instance, the pose quality value may indicate that the distortion between the map frame and the inertial frame is within the range of map distortion values and therefore be communicated to a planner to determine a trajectory for the vehicle to follow. In other examples, the pose quality value may indicate that the distortion between the map frame and the inertial frame is outside the range of map distortion values and therefore information related to the pose quality value may not be communicated to the planner.

In various examples, the vehicle computing system 204 may modify, based at least in part on the map distortion value, a sensor measurement parameter associated with a sensor (e.g., any one or more of a sensor bias, a sensor drift, a sensor error, etc.). Measurements by sensors are associated with such values to represent errors in estimations. As a non-limiting example, by taking into account map distortion as described herein, sensor bias estimations may be improved by removing a portion of the bias estimation due associated with gravity. In this way, an IMU bias value may be estimated with more precision because gravity bias can be identified by the model and removed from one of the several factors contributing to the IMU bias value (e.g., the gravity bias is removed from the IMU bias).

If the second model is being trained (e.g., "yes" in the operation 414), the process continues to operation 418 to update a parameter(s) of the model based at least in part on the output by the model. Of course, in some examples, operations can be performed in parallel, depending on an implementation.

At the operation 416, data representing the output by the model may be communicated with the planning component of the vehicle computing system to plan a trajectory for the vehicle that is based at least in part on the output by the model. Data representing the output by the model may also or instead be sent to the localization component and/or the perception component for use in processing sensor data (e.g., determining a position, orientation, or pose of the vehicle, determining a gravity vector, and so on). Additional details of controlling a vehicle using an output from the model are discussed throughout the disclosure.

At the operation 418, one or more parameters of the model may be updated, altered, and/or augmented to train the model. In some instances, the output 322 from the model component 230 can be compared against training data (e.g., ground truth representing labeled image data) for use in training. Based at least in part on the comparison, parameter(s) associated with the model component 230 can be updated.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 402, 404, 406, 408, 410, and 412 may be performed without operation 414. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data from a sensor associated with a vehicle; determining, based at least in part on the sensor data, a first vehicle pose relative to a first inertial reference frame at a first location; determining a first map distortion value representative of distortion between a map reference frame and the first inertial reference frame at the first location, the first map distortion value indicative of a difference in a direction of gravity between the map reference frame and the first inertial reference frame; determining, based at least in part on the first map distortion value and the first vehicle pose, a second vehicle pose relative to the map reference frame at the first location; determining, based at least in part on the first vehicle pose and the second vehicle pose at the first location, a second map distortion value representative of distortion between the map reference frame and a second inertial reference frame associated with a second location different from the first location; and controlling the vehicle based at least in part on the second map distortion value.

B: A system as paragraph A describes, the operations further comprising determining the second map distortion value further based at least in part on a distance between the first location and the second location.

C: A system as paragraphs A or B describe, the operations further comprising determining the first map distortion value based at least in part on a difference between first vehicle motion relative to the map reference frame and second vehicle motion relative to the first inertial reference frame.

D: A system as paragraphs A-C describe, the operations further comprise at least one of: causing, based at least in part on the second map distortion value, the vehicle to navigate to a destination; determining, based at least in part on the second map distortion value, a third vehicle pose relative to the second inertial reference frame associated with the second location; determining a region of a map having a likelihood for map distortion, associating the second map distortion value with the region of the map based at least in part on the likelihood, and causing the map to be sent to an additional vehicle for use in navigating the additional vehicle; or determining, based at least in part on the first map distortion value, a pose quality value representative of a change in the second vehicle pose relative to the map reference frame caused by a difference between the map reference frame and the first inertial reference frame at the first location.

E: A system as paragraphs A-D describe, the operations further comprising modifying, based at least in part on the first map distortion value or the second map distortion value, a sensor parameter associated with the sensor.

F: A method comprising: receiving sensor data from a sensor associated with a vehicle; receiving map data of an environment associated with the vehicle; determining, based at least in part on the sensor data, a first value indicative of a vehicle pose relative to a first frame associated with a first time; determining, based at least in part on the map data, a second value indicative of the vehicle pose relative to a second frame associated with the first time; inputting the first value and the second value into a machine learned model; receiving, from the machine learned model, a map distortion value indicative of distortion between the first frame and the second frame associated with the first time; and based at least in part on the map distortion value, at least one of: updating a map associated with the map data; determining a first vehicle pose relative to the second frame associated with the first time; determining a second vehicle pose relative to the second frame associated with a second time different from the first time; or updating a sensor parameter.

G: A method as paragraph F describes, wherein: the first frame comprises a first map frame or an inertial frame and the second frame comprises a second map frame.

H: A method as paragraphs F or G describe, wherein: the first frame comprises a first map frame or an inertial frame and the second frame comprises a second map frame.

I: A method as paragraphs F-H describe, further comprising: determining a difference between the first map distortion value and the second map distortion value; and updating a map associated with the second frame based at least in part on the difference.

J: A method as paragraphs F-I describe, further comprising: determining the first vehicle pose relative to the second frame associated with the first time; determining, based at least in part on the map distortion value, a pose quality value associated with the distortion between the first frame and the second frame; and determining, based at least in part on the pose quality value meeting or exceeding a pose quality threshold, that the first vehicle pose is usable by a vehicle controller to control operation of the vehicle.

K: A method as paragraphs F-J describe, wherein the map distortion value is a first map distortion value, the method further comprising determining a second map distortion value based at least in part on a first vector associated with a direction of gravity of the first frame and a second vector associated with the direction of gravity of the second frame.

L: A method as paragraphs F-K describe, wherein determining the vehicle pose relative to the second frame is based at least in part on lidar data.

M: A method as paragraphs F-L describe, wherein the map distortion value is a first map distortion value, the method further comprising determining a second map distortion value based at least in part on a distance between a vehicle pose relative to the second frame at the first time and an estimated vehicle pose relative to the second frame at the second time.

N: A method as paragraphs F-M describe, wherein the map distortion value is a first map distortion value, the method further comprising determining a second map distortion value based at least in part on a difference between first vehicle motion relative to the second frame at the first time and second vehicle motion relative to the first frame at the first time.

O: A method as paragraphs F-N describe, further comprising at least one of: causing, based at least in part on the map distortion value, the vehicle to navigate to a destination; determining, based at least in part on the map distortion value, a third vehicle pose relative to a third frame associated with the second time; determining a region of a map having a likelihood for map distortion, associating the map distortion value with the region of the map based at least in part on the likelihood, and configuring the map for use in navigating the vehicle; or determining, based at least in part on the map distortion value, a pose quality value representative of a change in the second vehicle pose relative to the second frame caused by a difference between the first frame and the second frame at the first time.

P: A method as paragraphs F-O describe, wherein the map distortion value is indicative of a difference, a location, a pose, or an orientation between a first vector in the first frame and a second vector in the second frame.

Q: One or more non-transitory computer-readable media storing instructions that, when executed, cause one or more processors to perform operations comprising: receiving sensor data from a sensor associated with a vehicle; receiving map data of an environment associated with the vehicle; determining, based at least in part on the sensor data, a first value indicative of a vehicle pose relative to a first frame associated with a first time; determining, based at least in part on the map data, a second value indicative of the vehicle pose relative to a second frame associated with the first time; inputting the first value and the second value into a machine learned model; receiving, from the machine learned model, a map distortion value indicative of distortion between the first frame and the second frame associated with the first time; and based at least in part on the map distortion value, at least one of: updating a map associated with the map data; determining a first vehicle pose relative to the second frame associated with the first time; determining a second vehicle pose relative to the second frame associated with a second time different from the first time; or updating a sensor parameter.

R: One or more non-transitory computer-readable media as paragraph Q describes, wherein the first frame comprises a first map frame or an inertial frame and the second frame comprises a second map frame.

S: One or more non-transitory computer-readable media as paragraphs Q or R describe, the operations further comprising modifying, based at least in part on the map distortion value, a sensor parameter associated with the sensor.

T: One or more non-transitory computer-readable media as paragraphs Q-S describe, wherein the map distortion value is a first map distortion value indicative of a difference, a location, a pose, or an orientation between a first vector in the first frame and a second vector in the second frame.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data from a sensor associated with a vehicle;
determining, based at least in part on the sensor data, a first vehicle pose relative to a first inertial reference frame at a first location;
determining a first map distortion value representative of one or more of a difference in distance, orientation, location, or pose between a map reference frame and the first inertial reference frame at the first location, the first map distortion value indicative of a difference in a direction of gravity between the map reference frame and the first inertial reference frame;
determining, based at least in part on the first map distortion value and the first vehicle pose, a second vehicle pose relative to the map reference frame at the first location;
determining, based at least in part on the first vehicle pose and the second vehicle pose at the first location, a second map distortion value representative of one or more of a difference in distance, orientation, location, or pose between the map reference frame and a second inertial reference frame associated with a second location different from the first location; and
controlling the vehicle based at least in part on the second map distortion value,
wherein the first map distortion value represents a first transform between the map reference frame and the first inertial reference frame, and
wherein the second map distortion value represents a second transform between the map reference frame and the first inertial reference frame.

2. The system of claim 1, the operations further comprising determining the second map distortion value further based at least in part on a distance between the first location and the second location.

3. The system of claim 1, the operations further comprising determining the first map distortion value based at least in part on a difference between first vehicle motion relative to the map reference frame and second vehicle motion relative to the first inertial reference frame.

4. The system of claim 1, the operations further comprise at least one of:
causing, based at least in part on the second map distortion value, the vehicle to navigate to a destination;
determining, based at least in part on the second map distortion value, a third vehicle pose relative to the second inertial reference frame associated with the second location;
determining a region of a map having a likelihood for map distortion, associating the second map distortion value with the region of the map based at least in part on the likelihood, and causing the map to be sent to an additional vehicle for use in navigating the additional vehicle; or1
determining, based at least in part on the first map distortion value, a pose quality value representative of a change in the second vehicle pose relative to the map reference frame caused by a difference between the map reference frame and the first inertial reference frame at the first location.

5. The system of claim 1, the operations further comprising modifying, based at least in part on the first map distortion value or the second map distortion value, a sensor parameter associated with the sensor.

6. A method comprising:
receiving sensor data from a sensor associated with a vehicle;
receiving map data of an environment associated with the vehicle;
determining, based at least in part on the sensor data, a first value indicative of a vehicle pose relative to a first frame associated with a first time;
determining, based at least in part on the map data, a second value indicative of the vehicle pose relative to a second frame associated with the first time;
inputting the first value and the second value into a machine learned model;
receiving, from the machine learned model, a map distortion value indicative of one or more of a difference in distance, orientation, location, or pose between the first frame and the second frame associated with the first time, wherein the map distortion value represents a transform between the first frame and the second frame; and
based at least in part on the map distortion value, at least one of:

updating a map associated with the map data;
determining a first vehicle pose relative to the second frame associated with the first time;
determining a second vehicle pose relative to the second frame associated with a second time different from the first time; or
updating a sensor parameter.

7. The method of claim 6, wherein:
the first frame comprises a first map frame or an inertial frame and the second frame comprises a second map frame.

8. The method of claim 7, wherein the map distortion value is a first map distortion value and the transform is a first transform, the method further comprising:
determining a difference between the first map distortion value and a second map distortion value, wherein the second map distortion value represents a second transform between the first frame and the second frame; and
updating a map associated with the second frame based at least in part on the difference.

9. The method of claim 6, further comprising:
determining the first vehicle pose relative to the second frame associated with the first time;
determining, based at least in part on the map distortion value, a pose quality value associated with one or more of the difference in distance, orientation, location, or pose between the first frame and the second frame; and
determining, based at least in part on the pose quality value meeting or exceeding a pose quality threshold, that the first vehicle pose is usable by a vehicle controller to control operation of the vehicle.

10. The method of claim 6, wherein the map distortion value is a first map distortion value, the method further comprising determining a second map distortion value based at least in part on a first vector associated with a direction of gravity of the first frame and a second vector associated with the direction of gravity of the second frame.

11. The method of claim 6, wherein determining the vehicle pose relative to the second frame is based at least in part on lidar data.

12. The method of claim 6, wherein the map distortion value is a first map distortion value, the method further comprising determining a second map distortion value based at least in part on a distance between a vehicle pose relative to the second frame at the first time and an estimated vehicle pose relative to the second frame at the second time.

13. The method of claim 6, wherein the map distortion value is a first map distortion value, the method further comprising determining a second map distortion value based at least in part on a difference between first vehicle motion relative to the second frame at the first time and second vehicle motion relative to the first frame at the first time.

14. The method of claim 6, further comprising at least one of:
causing, based at least in part on the map distortion value, the vehicle to navigate to a destination;
determining, based at least in part on the map distortion value, a third vehicle pose relative to a third frame associated with the second time;
determining a region of a map having a likelihood for map distortion, associating the map distortion value with the region of the map based at least in part on the likelihood, and configuring the map for use in navigating the vehicle; or
determining, based at least in part on the map distortion value, a pose quality value representative of a change in the second vehicle pose relative to the second frame caused by a difference between the first frame and the second frame at the first time.

15. The method of claim 6, wherein the map distortion value is indicative of a difference, a location, a pose, or an orientation between a first vector in the first frame and a second vector in the second frame.

16. One or more non-transitory computer-readable media storing instructions that, when executed, cause one or more processors to perform operations comprising:
receiving sensor data from a sensor associated with a vehicle;
receiving map data of an environment associated with the vehicle;
determining, based at least in part on the sensor data, a first value indicative of a vehicle pose relative to a first frame associated with a first time;
determining, based at least in part on the map data, a second value indicative of the vehicle pose relative to a second frame associated with the first time;
inputting the first value and the second value into a machine learned model;
receiving, from the machine learned model, a map distortion value indicative of one or more of a difference in distance, orientation, location, or pose between the first frame and the second frame associated with the first time, wherein the map distortion value represents a transform between the first frame and the second frame; and
based at least in part on the map distortion value, at least one of:
updating a map associated with the map data;
determining a first vehicle pose relative to the second frame associated with the first time;
determining a second vehicle pose relative to the second frame associated with a second time different from the first time; or
updating a sensor parameter.

17. The one or more non-transitory computer-readable media of claim 16, wherein the first frame comprises a first map frame or an inertial frame and the second frame comprises a second map frame.

18. The one or more non-transitory computer-readable media of claim 17, wherein the map distortion value is a first map distortion value, the operations further comprising:
determining a difference between the first map distortion value and a second map distortion value, wherein the second map distortion value represents a 6 Degrees-of-Freedom transform between the first frame and the second frame; and
updating a map associated with the second frame based at least in part on the difference.

19. The one or more non-transitory computer-readable media of claim 16, the operations further comprising modifying, based at least in part on the map distortion value, a sensor parameter associated with the sensor.

20. The one or more non-transitory computer-readable media of claim 16, wherein the map distortion value is a first map distortion value indicative of a difference, a location, a pose, or an orientation between a first vector in the first frame and a second vector in the second frame.

* * * * *